US009544207B2

(12) United States Patent
Allen et al.

(10) Patent No.: US 9,544,207 B2
(45) Date of Patent: Jan. 10, 2017

(54) USING DIFFERENT CONNECTIVITY CHECKS TO DETERMINE CAUSES OF CONNECTIVITY ISSUES

(71) Applicant: Microsoft Technology Licensing, LLC, Redmond, WA (US)

(72) Inventors: Nicole Allen, Redmond, WA (US); Zhipeng Zhao, Bellevue, WA (US); Zhengwen Zhu, Redmond, WA (US); Bradley Hughes, Catawba, SC (US); Dionicio Avila, Redmond, WA (US); Shawn McGrath, Redmond, WA (US); Jason Nelson, Redmond, WA (US); John Tait, Redmond, WA (US); Aaron Whitney, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 691 days.

(21) Appl. No.: 13/923,895

(22) Filed: Jun. 21, 2013

(65) Prior Publication Data
US 2014/0379894 A1 Dec. 25, 2014

(51) Int. Cl.
*H04L 12/26* (2006.01)
*H04L 12/24* (2006.01)

(52) U.S. Cl.
CPC ......... *H04L 43/065* (2013.01); *H04L 41/0645* (2013.01); *H04L 41/0677* (2013.01); *H04L 43/0811* (2013.01)

(58) Field of Classification Search
CPC ............. H04L 41/0645; H04L 41/0677; H04L 41/065; H04L 41/0654; H04L 43/065; H04L 43/0811
(Continued)

(56) References Cited

U.S. PATENT DOCUMENTS 6,392,990 B1 * 5/2002 Tosey ................. H04L 12/2697 370/218
6,970,919 B1 * 11/2005 Doi ..................... H04L 41/0631 345/440

(Continued)

FOREIGN PATENT DOCUMENTS

CA 2195893 A1 * 7/1998 ......... H04Q 11/0478
CN 1917454 A * 2/2007
(Continued)

OTHER PUBLICATIONS

International Search Report and Written Opinion for PCT Application No. PCT /US2014/041018 mailed Oct. 7, 2014, 13 pages.
(Continued)

*Primary Examiner* — Kostas Katsikis
(74) *Attorney, Agent, or Firm* — Anand Gupta; Tom Wong; Micky Minhas

(57) ABSTRACT

Connectivity is tested using different locations and contexts selected from different possible failure zones. The failure zones may include: client failure zones; Internet failure zones; and online service failure zones. The results relating to different connectivity tests performed using the different failure zones are correlated and analyzed in an attempt to determine a root cause of the connectivity issue. For example, the root cause may be determined to be a configuration problem of the client, a problem with the client's networking equipment, an ISP problem, an Internet backbone problem; a problem of the online service, and the like. Different contexts may also be used when performing the tests. These results may be compared to the other connectivity test results. The results from the tests may be provided to the client experiencing the problem. Aggregated test results may also be used to detect service wide issues and trigger an alert.

13 Claims, 11 Drawing Sheets

(58) Field of Classification Search
USPC .................................................. 709/203, 224
See application file for complete search history.

(56) References Cited

U.S. PATENT DOCUMENTS

| | | | | |
|---|---|---|---|---|
| 7,245,702 | B1* | 7/2007 | Mahaney | H04L 12/5601 379/15.01 |
| 7,607,049 | B2 | 10/2009 | Yasuie et al. | |
| 7,620,848 | B1* | 11/2009 | Tanner | G06F 11/0709 709/224 |
| 7,836,330 | B2 | 11/2010 | Yokota et al. | |
| 7,876,675 | B2* | 1/2011 | Ueno | H04L 12/1868 370/229 |
| 8,024,459 | B2* | 9/2011 | Robbins | H04L 12/2602 370/401 |
| 8,045,476 | B2* | 10/2011 | Mehta | H04N 7/17318 370/242 |
| 8,050,182 | B2 | 11/2011 | Yamamoto et al. | |
| 8,065,568 | B2 | 11/2011 | Watanabe et al. | |
| 8,661,295 | B1* | 2/2014 | Khanna | H04L 67/125 714/43 |
| 9,385,917 | B1* | 7/2016 | Khanna | H04L 41/0645 |
| 2002/0073062 | A1* | 6/2002 | Cerami | G06Q 10/087 |
| 2005/0144531 | A1* | 6/2005 | Challener | H04L 41/0654 714/39 |
| 2005/0183130 | A1 | 8/2005 | Sadja et al. | |
| 2006/0002409 | A1* | 1/2006 | Menon | H04L 41/065 370/409 |
| 2006/0004918 | A1* | 1/2006 | Lubeck | H04L 41/0853 709/223 |
| 2006/0087978 | A1* | 4/2006 | Sullivan | H04L 41/0631 370/242 |
| 2006/0149992 | A1 | 7/2006 | Shima | |
| 2006/0233312 | A1* | 10/2006 | Adams | H04Q 3/0075 379/21 |
| 2007/0076616 | A1* | 4/2007 | Ngo | H04L 12/2697 370/241 |
| 2007/0223917 | A1* | 9/2007 | Nagamine | H04L 41/046 398/1 |
| 2008/0267080 | A1* | 10/2008 | Sultan | H04L 12/2697 370/248 |
| 2009/0019320 | A1 | 1/2009 | Neary | |
| 2009/0116395 | A1* | 5/2009 | Sasaki | H04L 12/2697 370/245 |
| 2010/0074118 | A1* | 3/2010 | Gale | H04L 12/2697 370/242 |
| 2011/0141921 | A1* | 6/2011 | Reese | H04L 41/5032 370/252 |
| 2012/0157089 | A1* | 6/2012 | Yang | H04L 12/2464 455/424 |
| 2012/0296607 | A1* | 11/2012 | Jain | H04L 41/0645 702/185 |
| 2013/0051247 | A1* | 2/2013 | Reese | H04L 43/08 370/242 |
| 2013/0322262 | A1* | 12/2013 | Akman | H04W 24/10 370/242 |
| 2013/0336104 | A1* | 12/2013 | Talla | H04L 45/245 370/216 |
| 2014/0254390 | A1* | 9/2014 | Ansley | H04W 24/06 370/241 |
| 2014/0269342 | A1* | 9/2014 | Baron | H04L 43/50 370/242 |

FOREIGN PATENT DOCUMENTS

| | | | | |
|---|---|---|---|---|
| EP | 1081627 | A2 * | 3/2001 | ......... G06F 19/3412 |
| FR | WO 2013045509 | A1 * | 4/2013 | ......... H04L 41/0663 |
| GB | WO 2008117004 | A1 * | 10/2008 | ......... H04L 41/0677 |
| JP | 4611197 | B2 * | 1/2011 | ............. H04L 12/28 |
| JP | 5075727 | B2 * | 11/2012 | ......... H04L 41/0677 |
| KR | 20010038471 | A * | 5/2001 | |
| KR | 20050065346 | A * | 6/2005 | ......... G06F 11/2007 |
| KR | 20080035388 | A * | 4/2008 | ............. H04L 41/12 |
| SG | WO 2012096630 | A1 * | 7/2012 | ........... H04B 10/073 |
| WO | WO 2008156782 | A3 * | 6/2009 | ......... H04L 12/2697 |

OTHER PUBLICATIONS

"How to Troubleshoot Network Connectivity Problems in Internet Explorer", Published on: Jun. 19, 2013, Available at: http://web.archive.org/web/20130619063056/http://support.microsoft.com/kb/936211?

"Cisco Network Connectivity Monitor 1.1", Retrieved on: Apr. 24, 2013, Available at: http://www.cisco.com/en/US/prod/collateral/netmgtsw/ps6504/ps5929/ps4879/product_data_sheet0900aecd801bd1f2.pdf.

"Microsoft Exchange Analyzers", Retrieved on: Apr. 24, 2013, Available at: http://technet.microsoft.com/en-us/exchange/bb288481.aspx.

Kleinberg, et al., "Network Failure Detection and Graph Connectivity", In Proceedings of the 15th Annual ACM-SIAM Symposium on Discrete Algorithms, Jan. 11, 2004, pp. 17.

* cited by examiner

Mobile Computing Device

USING DIFFERENT CONNECTIVITY CHECKS TO DETERMINE CAUSES OF CONNECTIVITY ISSUES

BACKGROUND

Different applications and services may be used to monitor connectivity. For example, a monitoring service may be used to detect network performance for a service and to determine when a network failure occurs that involves the service. Similarly, a user may check configuration settings. When a connectivity failure does occur, it can be difficult to determine an exact cause of the problem.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Connectivity is tested using different locations and contexts selected from different possible failure zones. The failure zones may include: client failure zones; Internet failure zones; and online service failure zones. For example, a client connectivity test may be run, an outside connectivity test may be run, and a service connectivity test may be run to determine a cause of a connectivity issue. The client connectivity test is performed to test connectivity between a client computing device that is located within a client failure zone and an endpoint in the online service failure zone. The outside connectivity test is performed to test connectivity between an endpoint in the Internet failure zone and an endpoint in the online service failure zone. The service connectivity test is performed to test connectivity between an endpoint in the client failure zone and an endpoint in the online service failure zone. The results relating to the connectivity tests performed using the different failure zones are correlated and analyzed in an attempt to determine a root cause of the connectivity issue. For example, the root cause may be determined to be a configuration problem of the client, a problem with the client's networking equipment, an ISP problem (e.g. client or service), an Internet backbone problem; a problem of the online service, and the like. Different contexts may also be used when performing the tests. For example, the tests may be performed using both a test account as well as the actual user account. These results may be compared to the other connectivity test results. The results from the tests may be provided to the client experiencing the problem or they may be used by another application or service. The results may indicate how to correct the problem and if the problem requires an administrator or a call to the online service or to the ISP. Aggregated test results from previous connectivity tests that are received from different users/clients may also be used to detect service wide issues and trigger an alert that is sent directly to the problematic party (e.g., ISP or online service).

DETAILED DESCRIPTION

Figure 1:
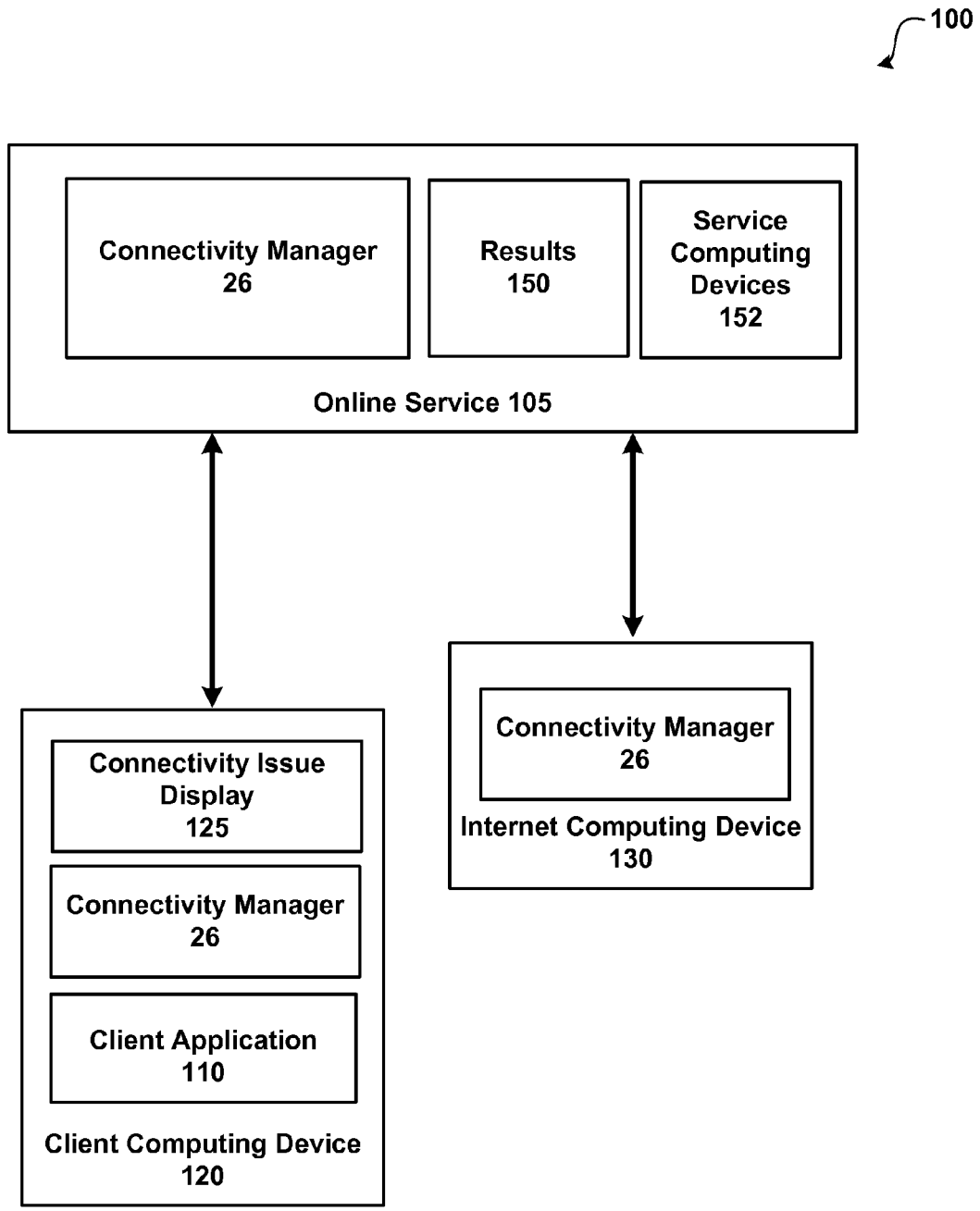
FIG. 1 shows an overview of a system for using connectivity checks from different locations to determine a cause of a connectivity issue.

Referring now to the drawings, in which like numerals represent like elements, various embodiments will be described.

FIG. 1 shows an overview of a system for using connectivity checks from different locations to determine a cause of a connectivity issue.

As illustrated, system 100 includes connectivity manager 26, results 150, online service 105, client computing device 120 and Internet computing device 130.

Connectivity manager 26 is configured to test connectivity using different locations and contexts to determine a possible cause of a connectivity issue. For example, a user of computing device 120 may be experiencing a connectivity issue when attempting to connect to online service 105 using client application 110. Different connectivity tests are performed by connectivity manager 26 in an attempt to identify what is causing a break in connectivity. The tests include connectivity checks and configuration checks (e.g., client and cloud server configuration checks). For example, connectivity manager 26 may identify feature misconfigurations such as a bad Domain Name System (DNS) record, incorrectly set up application profile, a bad configuration of Simple Mail Transfer Protocol (SMTP) connectors, and the like. A user may initiate the connectivity tests or the test may be started automatically in response to detecting a connectivity issue.

Connectivity manager 26 on client computing device 120 is configured to perform client connectivity tests from within the client environment to test the connectivity between the client and the online service 105. The client connectivity tests may include many different connectivity tests. For example, the connectivity tests may include tests to: check the client's networking equipment; check network settings that are associated with the computing device, client application 110, and online service 105; check connectivity with other Internet sites outside of online service 105; check operation of an Internet Service Provider (ISP) for the client; and the like. The tests may check both the operation of networking hardware as well as the operation of applications. For example, is the network cable connected, is the gateway working, is the Domain Name Server working, are there too many connections open, is a firewall configured properly, and the like. The tests may also check whether the client application 110 is configured as expected (e.g., correct client profile, matching version . . .).

Different contexts may also be used when performing the tests. For example, the tests may be performed using a both a test account as well as the actual user account. Each client connectivity test performed returns client connectivity test results that are compared with tests results performed from other locations.

Connectivity manager 26 on Internet computing device 130 is configured to perform outside connectivity tests from outside of the client environment to test the connectivity between an outside computing device and the online service 105. The outside connectivity tests may include the same set of connectivity tests or different connectivity tests. Each outside connectivity test performed returns outside connectivity test results that are compared with test results performed from other locations.

Connectivity manager 26 in online service 105 is configured to perform service connectivity tests between the online service 105 to the client environment using one or more of service computing devices 152 to perform the tests. The service connectivity tests may include the same set of connectivity tests or different connectivity tests performed in the other locations. Each service connectivity test performed returns service connectivity test results that are compared with tests results performed from other locations. The connectivity checks may be run from within online service 105 or within the data center hosting the service.

After performing the connectivity checks, one or more of the connectivity managers obtains the results from the different connectivity tests performed. Connectivity manager 26 compares and analyzes the results in an attempt to determine a root cause of the connectivity issue. For example, connectivity manager 26 may determine the root cause to be a configuration problem of the client, a problem with the client's networking equipment, an ISP problem (e.g. client or service), an Internet backbone problem; a problem of the online service, and the like.

In addition to testing and comparing connectivity from different locations, connectivity manager 26 compares tests run in different contexts. For example, connectivity tests may be run as the user experiencing the connectivity issue as well as using a test account on behalf of the user. The results from the different tests performed using the different contexts are compared by connectivity manager 26.

Unlike typical monitoring solutions, connectivity manager 26 can provide results 150 directly to the user experiencing the connectivity issue. The determined root cause and other information may be displayed on connectivity issue display 125. The results 150 provide guidance to the user on how to correct the connectivity issue. For example, results 150 may provide steps to correct the connectivity issue or inform the user that the connectivity issue should be addressed by an administrator or a call to the online service 105 should be made.

Results and solutions (not including personal information) may be stored by the online service for analysis. For example, the results 150 may be analyzed to improve the service, improve support for the service, and assist in determining what additional connectivity tests are to be added or deleted from the connectivity tests being performed. More details are provided below.

Figure 2:
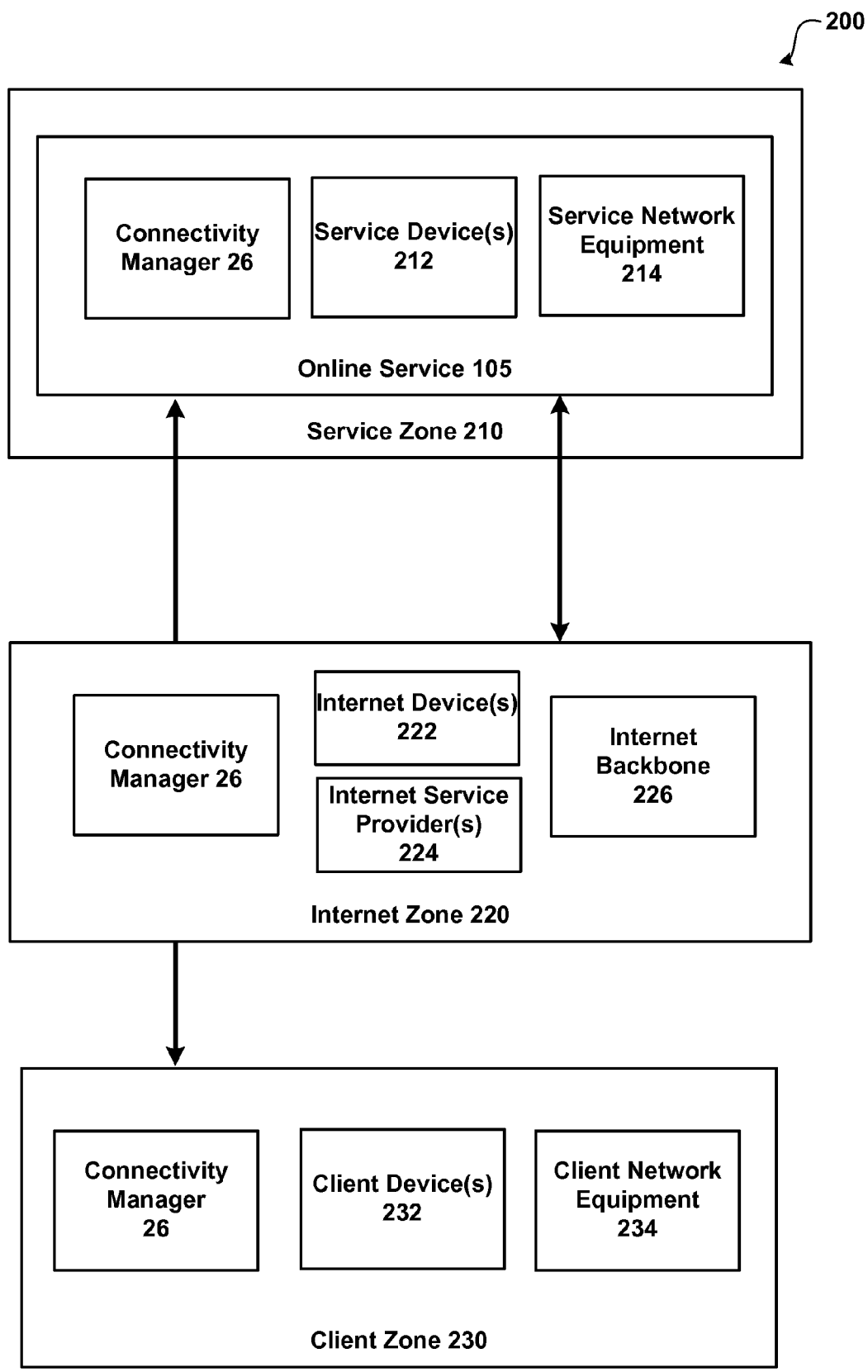
FIG. 2 illustrates a system for performing connectivity checks from different failure zones to determine a cause of a connectivity issue.

FIG. 2 illustrates a system 200 for performing connectivity checks from different failure zones to determine a cause of a connectivity issue.

As illustrated, system 200 includes service zone 210, Internet zone 220 and client zone 230.

Connectivity is tested between different locations and contexts. As illustrated, system 200 shows three different zones including the client zone 230, the Internet zone 220 and the service zone 210 that are used to determine a likely zone that is a cause of the connectivity issue. Generally, connectivity issues are caused by one of: the client computing device, the client's network environment, the "Internet" (including the client's ISP, the internet backbone, the service's ISP), or the service itself. According to an embodiment, client zone 230 and Internet zone 220 are considered to be within the client's control. The service zone 210 is considered to be within the online service's control. Connectivity issues with an ISP may be negotiated with either the customer's IT or the online service.

Client zone 230 includes connectivity manager 26, client devices 232, client network equipment 234. Client devices 232 includes the computing device experiencing a connectivity issue. Client connectivity checks may be run from one or more of client device(s) 232. For example, client connectivity checks may be run from the computing device of the customer who is experiencing the connectivity issue and/or from another client device.

Internet zone 220 includes connectivity manager 26, Internet devices 222, ISPs 224 and Internet backbone 226. Internet backbone 226 refers to data routes between interconnected networks and core routers on the Internet. These data routes are hosted by public and private network centers.

Service zone 210 includes online service 105 that includes connectivity manager 26, service devices 212 and service network equipment 214. According to an embodiment, online service 105 is an off-premise service from the client's network. According to another embodiment, online service 105 is on-premise and runs on the client's network.

For example, the root cause of a connectivity issue may be determined to be a configuration problem of the client, a problem with the client's networking equipment, an ISP problem (e.g. client or service), an Internet backbone problem; a problem of the online service, and the like. Different contexts may also be used when performing the tests. For example, the tests may be performed using a both a test account as well as the actual user account. These results may be compared to the other connectivity test results. The results from the tests may be provided to the client experiencing the problem. The results may indicate how to correct the problem and if the problem requires an administrator or a call to the online service or to the ISP. Aggregated test results from different connectivity checks and different users/clients may also be used to detect service wide issues and trigger an alert that is sent directly to the problematic party (e.g., ISP or online service.

FIGS. 3-6 illustrate processes for using different connectivity checks to determine a cause of a connectivity issue. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Figure 3:
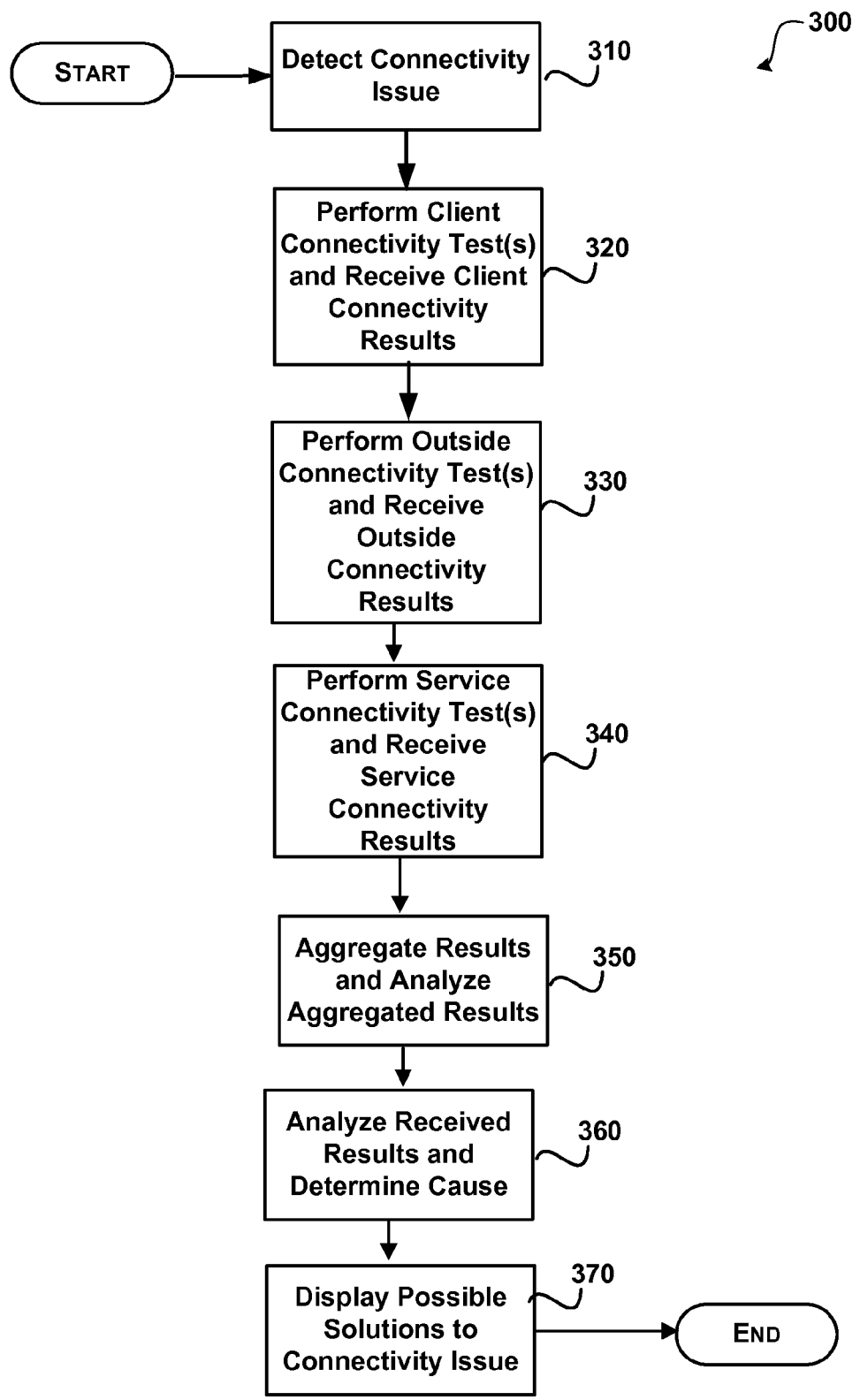
FIG. 3 shows a process for performing connectivity tests from different locations to determine a cause of a connectivity issue.

FIG. 3 shows a process for performing connectivity tests from different locations to determine a cause of a connectivity issue.

After a start operation, the process moves to operation 310, where a connectivity issue is detected. For example, a client may notice that it cannot connect to an online service. The connectivity issue may be detected manually by the user and/or automatically. For example, a determination may be automatically made that a network connection is not established between the client and the online service within a predetermined period of time. In response to detecting the connectivity issue, the connectivity tests are started to determine a root cause of the connectivity issue. As discussed herein, the connectivity checks can include both connectivity checks and configuration checks.

Transitioning to operation 320, client connectivity tests are performed and client connectivity tests results are received. The client connectivity tests are run from within the client zone. The tests may check both the operation of the hardware (e.g. a computing device and/or networking equipment) as well as the operation and settings of one or more applications used in connecting to the service. Different contexts may also be used when performing the client connectivity tests. For example, the tests may be performed using a both a test account as well as the actual user account.

Moving to operation 330, outside connectivity tests are performed from outside of the client zone and outside of the service zone. The outside connectivity tests may include the same set of connectivity tests used in a different zone or different connectivity tests from the other zones. Each outside connectivity test performed returns outside connectivity test results.

Flowing to operation 340, service connectivity tests are performed from inside of the service zone. The service connectivity tests may include the same set of connectivity tests used in a different zone or different connectivity tests from the other zones. Each service connectivity test performed returns outside connectivity test results.

Transitioning to operation 350, the test results are aggregated. According to an embodiment, the client connectivity results, the outside connectivity results and the service connectivity results are aggregated with other test results previously received. The aggregated test results may be used to detect service wide issues or other issues. According to an embodiment, when a service wide issue is detected, an alert is triggered that is sent directly to the problematic party (e.g., ISP or online service).

Moving to operation 360, the results received from each of the different zones are automatically or manually analyzed to locate the root cause of the connectivity issue as well as a zone that is responsible for fixing the connectivity issue. The connectivity results received from the client zone, the Internet zone and the service zone, may result in a more accurate indication of whether the root cause is due to a problem with the customer configuration or environment, the service, or an intermediary party.

Transitioning to operation 370, possible solutions to the connectivity issue are displayed. According to an embodiment, the solutions are displayed to the user that is experiencing the connectivity issue. For example, the solutions may be displayed directly within an application being used by the user that is experiencing the connectivity issue. The solutions are user-specific feedback that are based on the results from the different zones and different contexts.

The process then moves to an end operation and returns to processing other actions.

Figure 4:
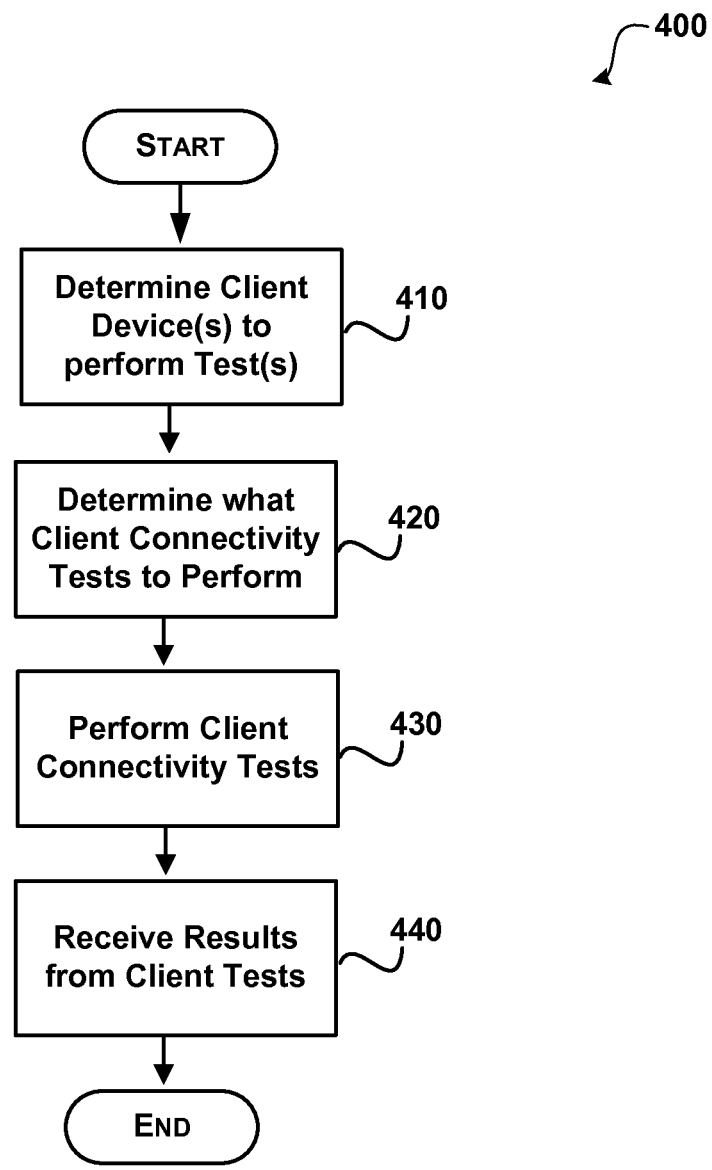
FIG. 4 shows a process for performing client connectivity tests.

FIG. 4 shows a process for performing client connectivity tests.

After a start operation, the process moves to operation 410, where the client device(s) on which to perform the client connectivity tests are determined. According to an embodiment, the client computing device experiencing the connectivity issue is selected. One or more other client computing devices may also be selected to perform the client connectivity tests.

Transitioning to operation 420, the client connectivity tests to perform in the client zone are determined. The tests may check both the operation of networking hardware as well as the operation of applications. For example, is the network cable connected, is the gateway working, is the Domain Name Server working, are there too many connections open, is a firewall configured properly, and the like. Different contexts may also be used when performing the tests. An example of the context is the user on whose behalf the test is run. The client connectivity checks may be performed using a test account on behalf of the user and the actual account of the user. According to an embodiment, identical tests are run in both contexts. This is different form monitoring services which typically run using test accounts and test data.

Moving to operation 430, the client connectivity tests are performed.

Flowing to operation 440, the client connectivity tests results obtained from performing the different client connectivity tests are received. The client connectivity test results are compared with the other test results received to determine a cause of the connectivity issue.

The process then moves to an end operation and returns to processing other actions.

Figure 5:
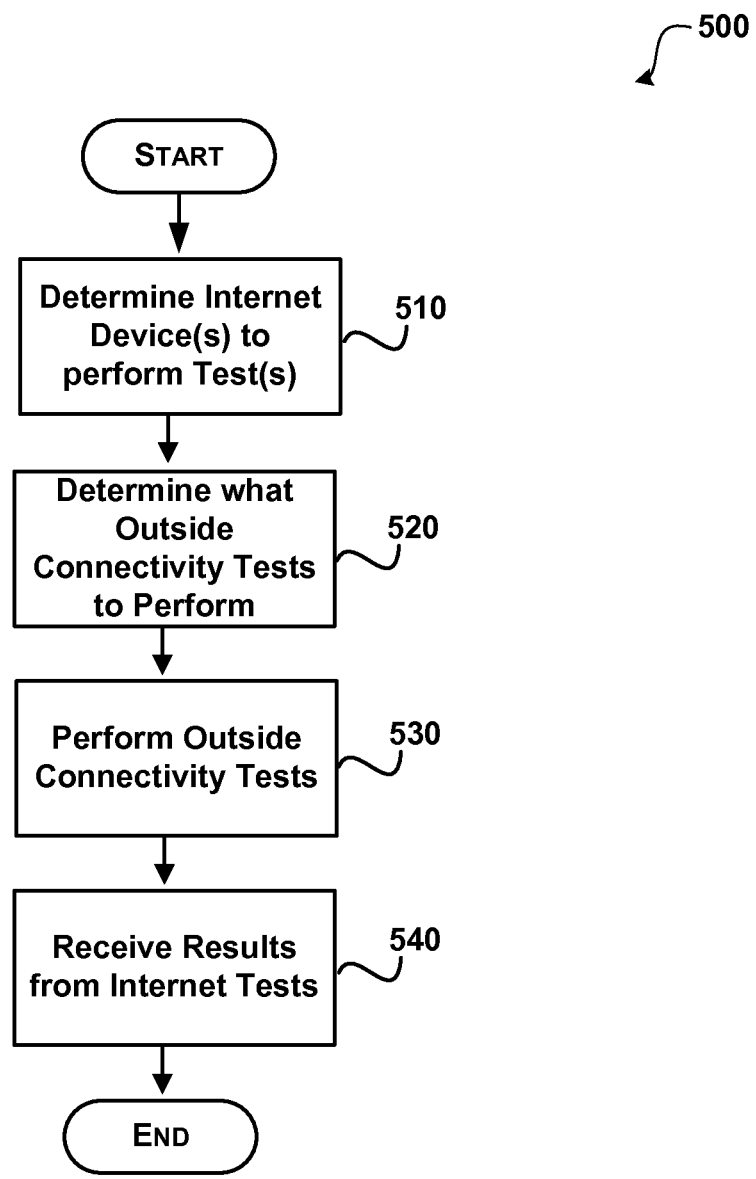
FIG. 5 shows a process for performing outside connectivity tests.

FIG. 5 shows a process for performing outside connectivity tests.

After a start operation, the process moves to operation 510, where the Internet device(s) on which to perform the outside connectivity tests are determined. One or more other Internet computing devices may also be selected to perform the outside connectivity tests.

Transitioning to operation 520, the outside connectivity tests to perform in the Internet zone are determined. The tests may check both the operation of networking hardware as well as the operation of applications. The outside connectivity tests may be the same or different connectivity tests that are performed in other zones.

Moving to operation 530, the outside connectivity tests are performed.

Flowing to operation 540, the outside connectivity tests results obtained from performing the different outside connectivity tests are received. The outside connectivity test results are compared with the other test results received to determine a cause of the connectivity issue.

The process then moves to an end operation and returns to processing other actions.

Figure 6:
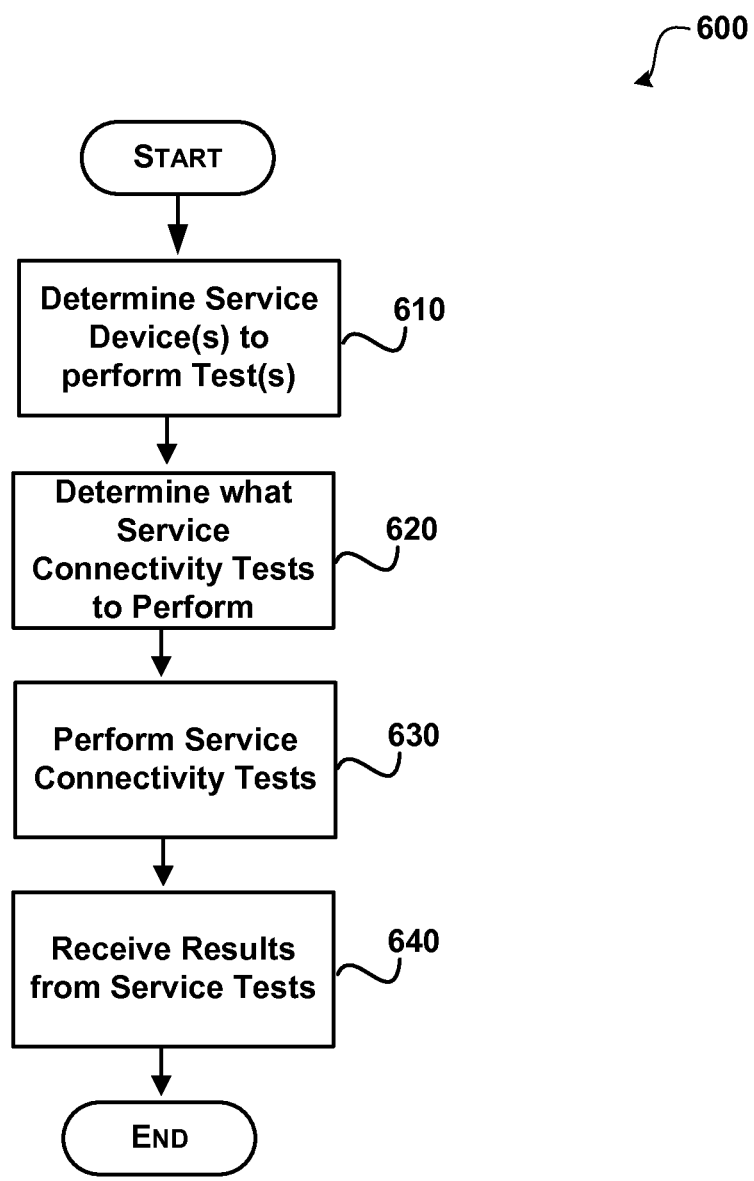
FIG. 6 shows a process for performing service connectivity tests.

FIG. 6 shows a process for performing service connectivity tests.

After a start operation, the process moves to operation 610, where the service device(s) on which to perform the service connectivity tests are determined. One or more other service computing devices may also be selected to perform the service connectivity tests.

Transitioning to operation 620, the service connectivity tests to perform in the service zone are determined. The tests may check both the operation of networking hardware as well as the operation of applications and service. The service connectivity tests may be the same or different connectivity tests that are performed in other zones.

Moving to operation 630, the service connectivity tests are performed.

Flowing to operation 640, the service connectivity tests results obtained from performing the different service connectivity tests are received. The service connectivity test results are compared with the other test results received to determine a cause of the connectivity issue.

The process then moves to an end operation and returns to processing other actions.

Figure 7:
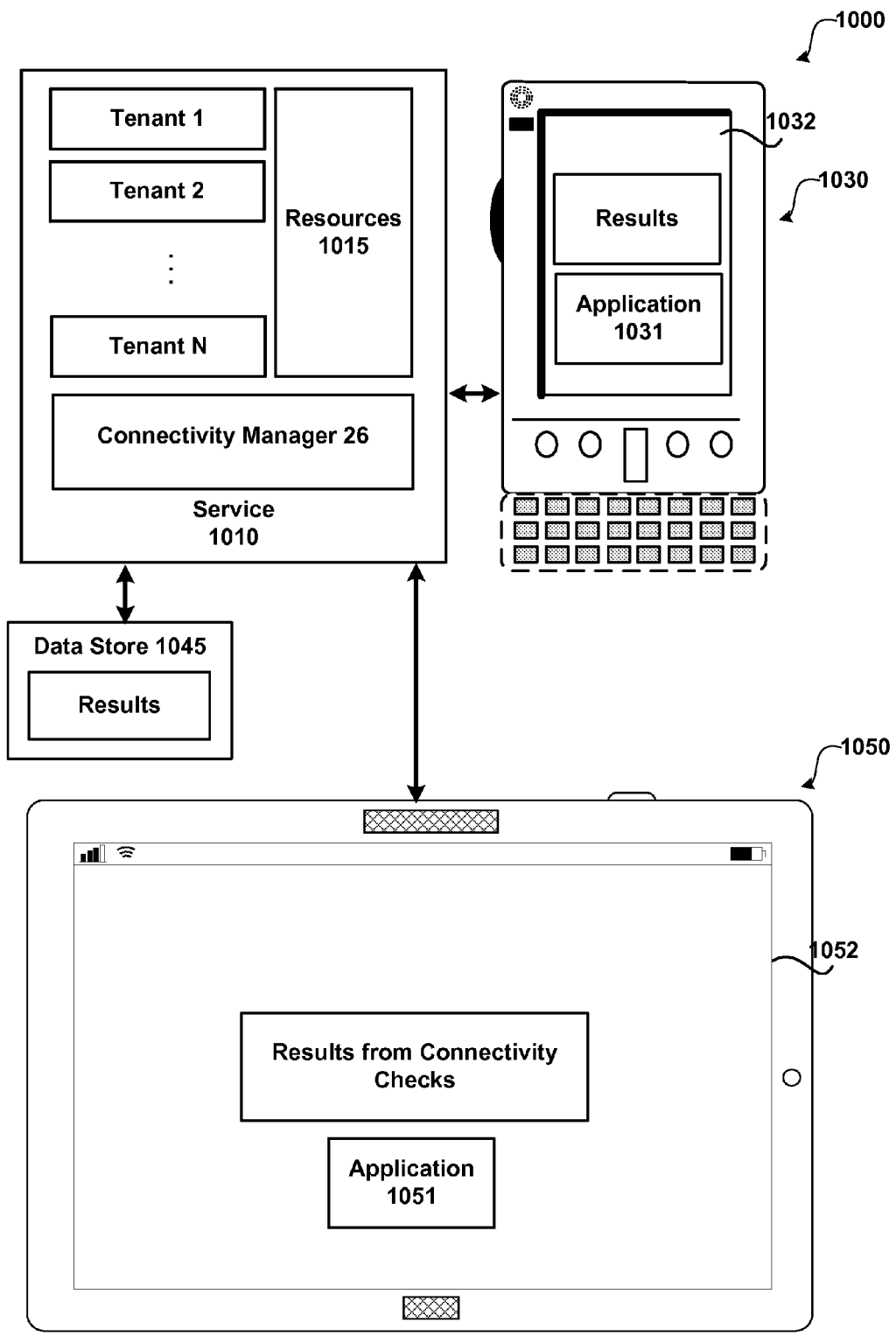
FIG. 7 illustrates an exemplary online system that uses different locations and contexts to determine network problems.

FIG. 7 illustrates an exemplary online system that uses different locations and contexts to determine network problems. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services, such as productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with applications (1031, 1051).

As illustrated, touch screen input device/display 1050 and smart phone 1030 shows exemplary displays 1052/1032 showing the use of an application determining a cause of a connectivity issues with service 1010. Data may be stored on a device (e.g. smart phone 1030, slate 1050 and/or at some other location (e.g. network data store 1045). Data store 1054 may be used to store the results and other content. The applications used by the devices may be client based applications, server based applications, cloud based applications and/or some combination.

Connectivity manager 26 is configured to perform operations relating to performing connectivity checks from different locations to determine a cause of a connectivity issue as described herein. While manager 26 is shown within service 1010, the functionality of the manager may be included in other locations (e.g. on smart phone 1030 and/or slate device 1050).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
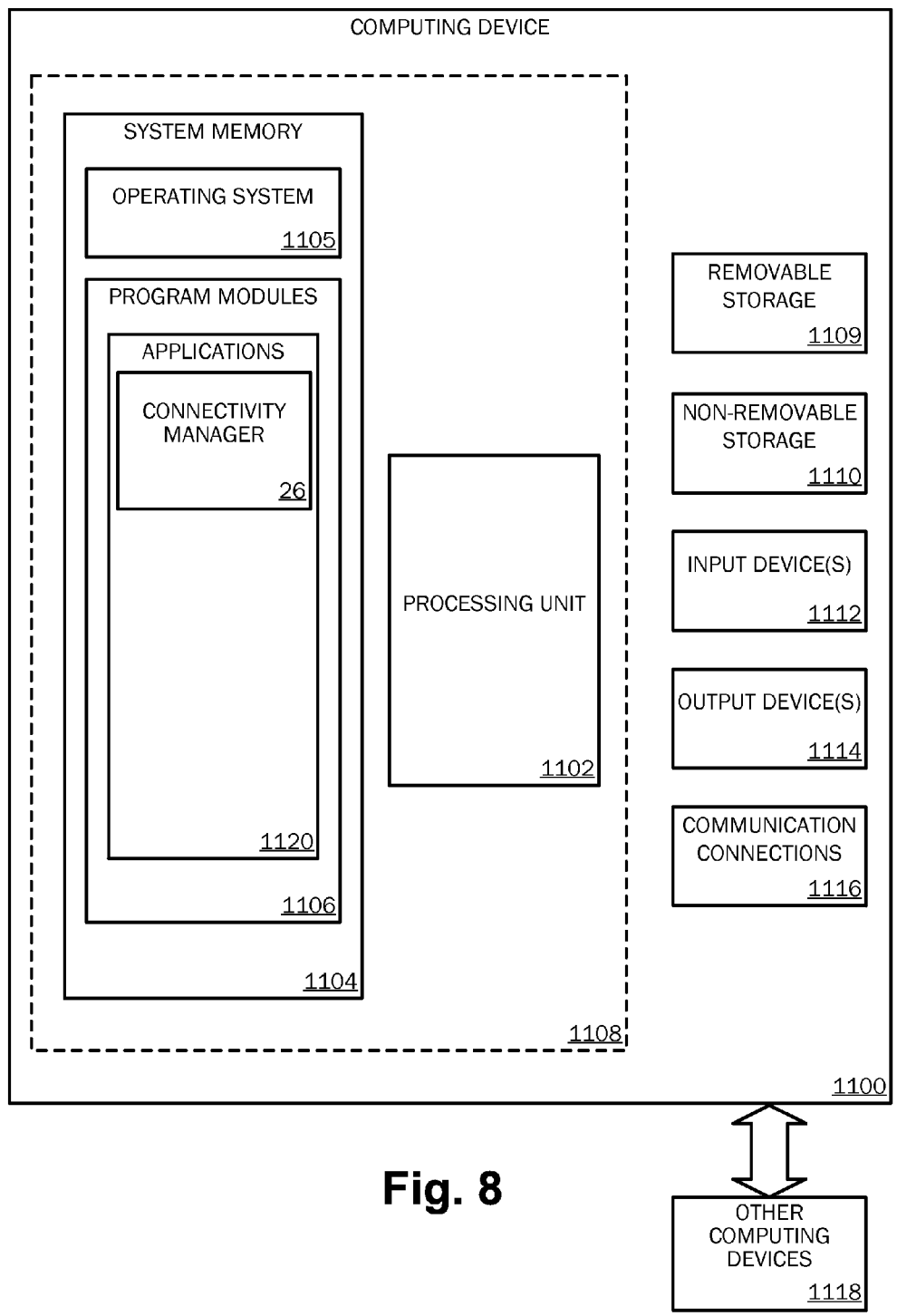
FIGS. 8, 9A, 9B and 10 and the associated descriptions provide a discussion of a variety of operating environments in which embodiments of the invention may be practiced.
Figure 9A:
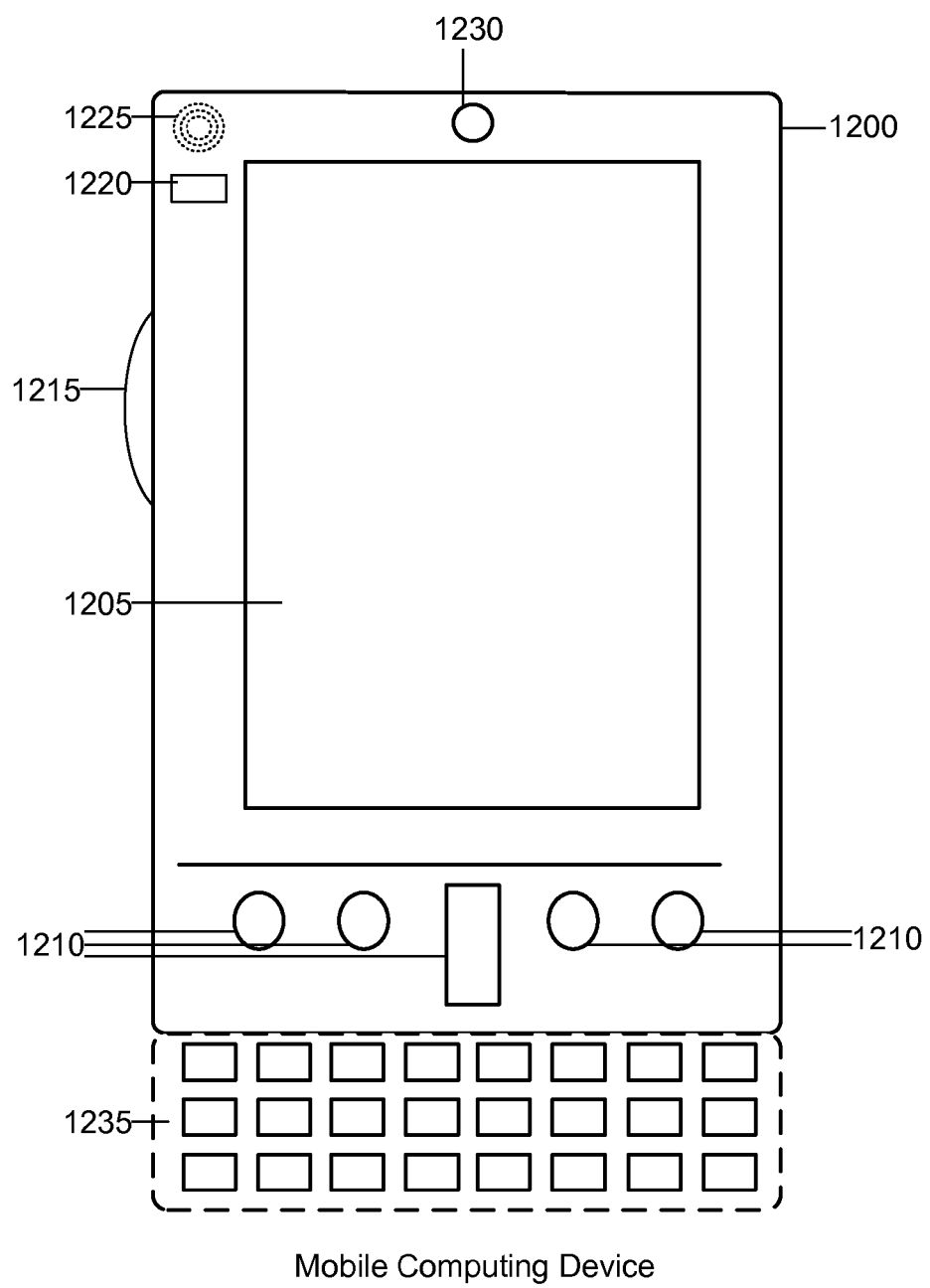
Figure 9B:
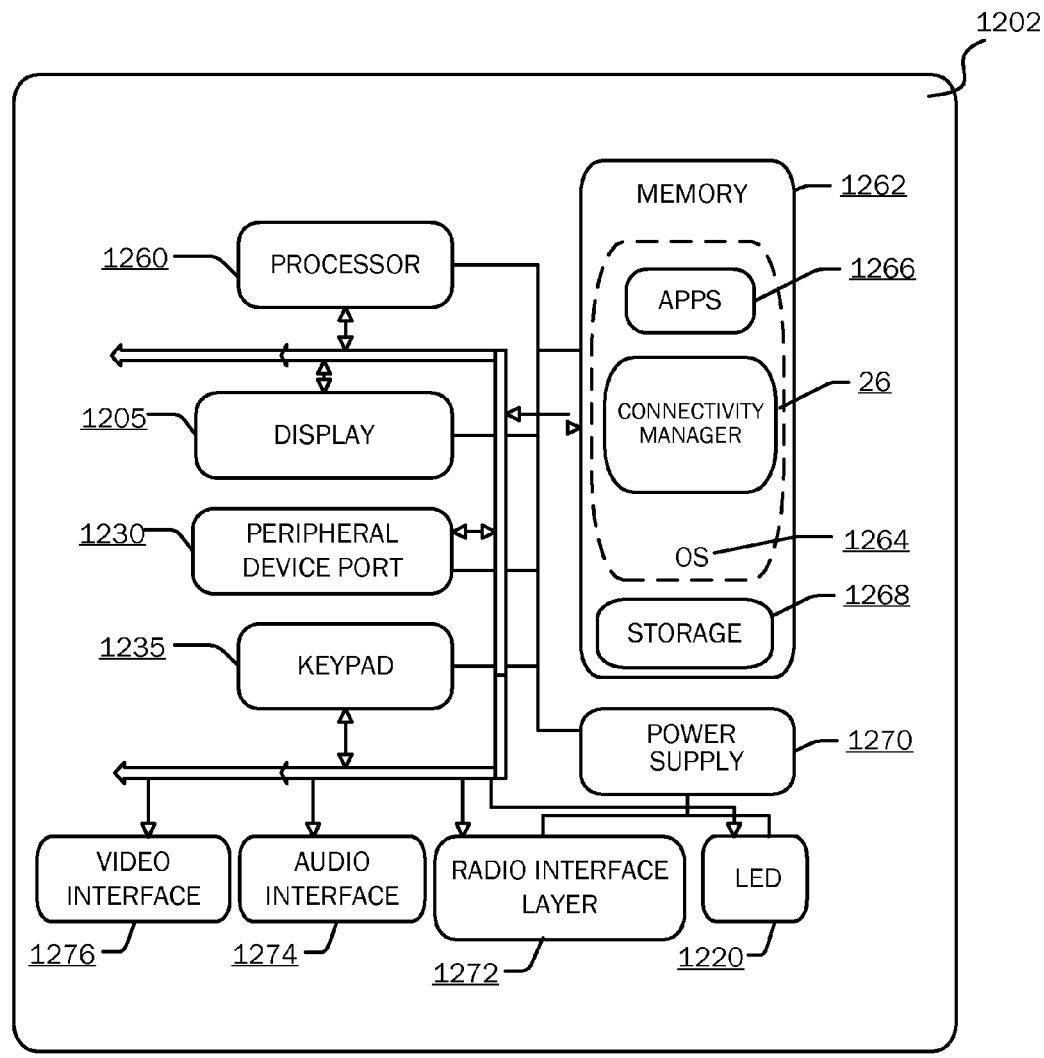
Figure 10:
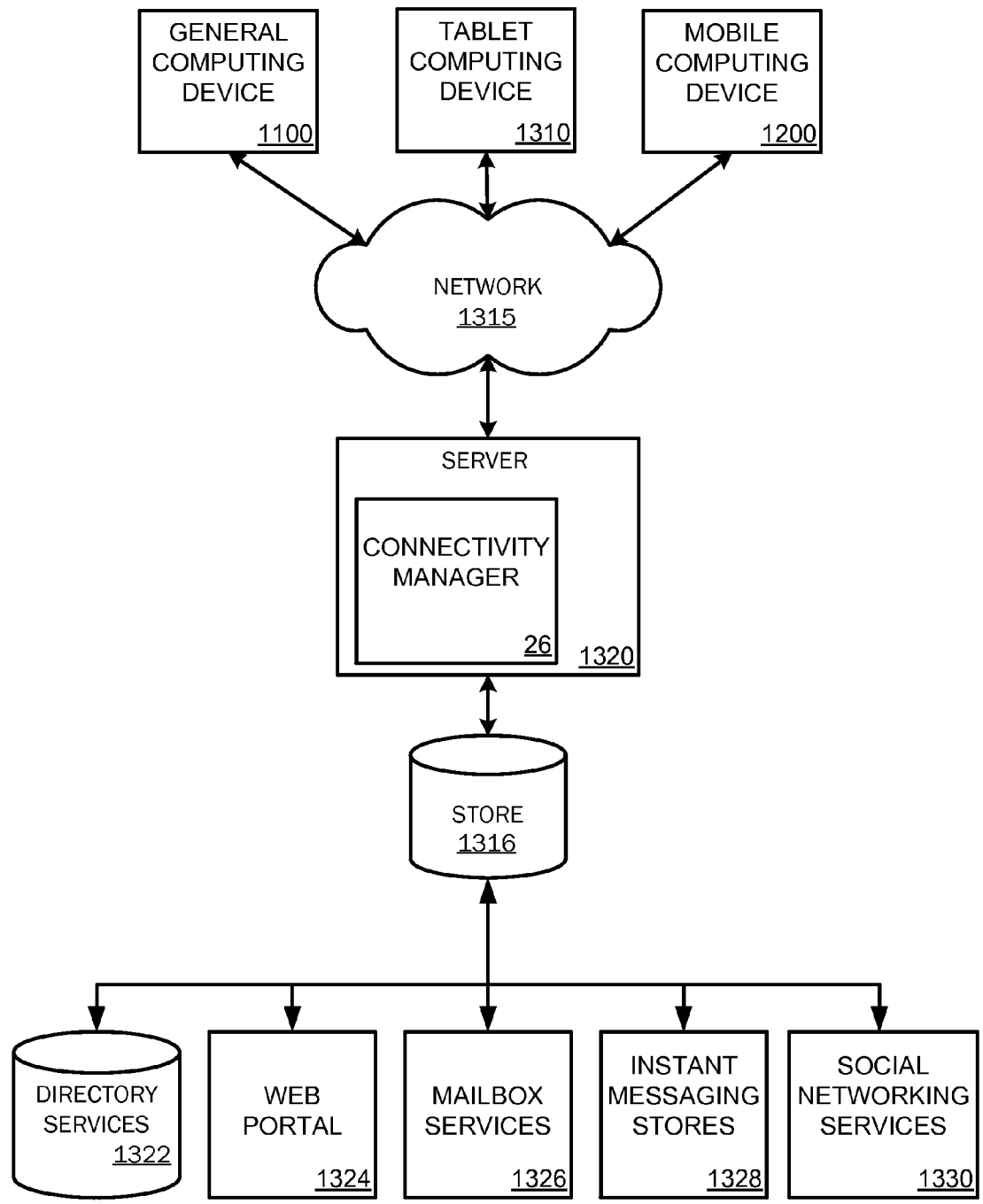

FIGS. 8-10 and the associated descriptions provide a discussion of a variety of operating environments in which embodiments of the invention may be practiced. However, the devices and systems illustrated and discussed with respect to FIGS. 8-10 are for purposes of example and illustration and are not limiting of a vast number of computing device configurations that may be utilized for practicing embodiments of the invention, described herein.

FIG. 8 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the connectivity manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 8 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 8 by a removable storage device 1109 and a non-removable storage device 1110.

As stated above, a number of program modules and data files may be stored in the system memory 1104. While executing on the processing unit 1102, the program modules 1106 (e.g., the connectivity manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the connectivity manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a mobile computing device 1200, for example, a mobile telephone, a smart phone, a tablet personal computer, a laptop computer, and the like, with which embodiments of the invention may be practiced. With reference to FIG. 9A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the connectivity manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 9B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 10 illustrates an embodiment of an architecture of an exemplary system, as described above. Content developed, interacted with, or edited in association with the connectivity manager 26 may be stored in different communication channels or other storage types. For example, various documents may be stored using a directory service 1322, a web portal 1324, a mailbox service 1326, an instant messaging store 1328, or a social networking site 1330. The connectivity manager 26 may use any of these types of systems or the like for enabling data utilization, as described herein. A server 1320 may provide the connectivity manager 26 to clients. As one example, the server 1320 may be a web server providing the connectivity manager 26 over the web. The server 1320 may provide the connectivity manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, and 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A computer implemented method for analyzing connectivity issues between a client and a service, comprising:
performing a client connectivity test on a client failure zone, wherein the client connectivity test includes at least one of testing a client device, testing one or more applications running on a client device, testing a client network equipment, and testing a client network;
generating client connectivity test results;
performing a service connectivity test on a service failure zone, the service connectivity test including at least one of testing the operation of the service, testing network of the service, testing the service applications;
generating service connectivity test results;
performing an outside connectivity test on an Internet failure zone, wherein the outside connectivity test includes testing the connectivity of the Internet outside of the client failure zone and the service failure zone;
generating outside connectivity test results;
automatically analyzing the client connectivity test results, the outside connectivity test results, and the service connectivity results to determine a possible cause of a connectivity issue; and
sending the possible cause to the client device.

2. The method of claim 1, wherein the Internet failure zone comprise an Internet Service Provider (ISP) and an Internet backbone, and wherein the service failure zone comprises a service computing device and a service network environment.

3. The method of claim 1, wherein performing the client connectivity test comprises using an account of the client when performing a first client connectivity test.

4. The method of claim 1, further comprising performing multiple tests for each of the client connectivity test and the outside connectivity test.

5. The method of claim 1, wherein performing the client connectivity test further comprises performing a plurality of connectivity checks from a client computing device in the client failure zone.

6. The method of claim 1, wherein sending the possible cause of the connectivity issue comprises sending a message to an application experiencing the connectivity issue a possible solution to the connectivity issue.

7. A system comprising:
a processor and memory;
an operating environment executing using the processor; and
a connectivity manager that is configured to perform actions comprising:
performing client connectivity tests on a client failure zone, wherein the client connectivity test includes at least one of testing a client device, testing one or more applications running on a client device, testing a client network equipment, and testing a client network;
generating client connectivity test results;
performing a service connectivity test on a service failure zone, the service connectivity test including at least one of testing the operation of the service, testing network of the service, testing the service applications;
generating service connectivity test results;
performing outside connectivity tests on an Internet failure zone, wherein the outside connectivity test includes testing the connectivity of the Internet outside of the client failure zone and the service failure zone;
generating outside connectivity test results;
automatically analyzing the client connectivity test results, the outside connectivity test results, and the service connectivity results to determine a possible cause of a connectivity issue; and
sending the possible cause to the client device.

8. The system of claim 7, wherein performing the client connectivity tests further comprises using an account of the client when performing a set of first client connectivity tests and using a test account when performing a second set of client connectivity tests.

9. The system of claim 8, wherein the Internet failure zone comprise an Internet Service Provider (ISP) and an Internet backbone; and wherein the service failure zone comprises a service computing device and a service network environment.

10. The system of claim 7, further comprising aggregating results by aggregating the client connectivity test results, the outside connectivity test results, and the service connectivity test results to form aggregated results; analyzing the aggregated results to determine a service wide issue and automatically triggering an alert in response to determining the service wide issue.

11. A computer storage medium storing computer-executable instructions for analyzing connectivity issues between a client and a service, comprising:
performing client connectivity tests on a client failure zone, wherein the client connectivity test includes at least one of testing a client device, testing one or more applications running on a client device, testing a client network equipment, and testing a client network;
generating client connectivity test results;
performing a service connectivity test on a service failure zone, the service connectivity test including at least one of testing the operation of the service, testing network of the service, testing the service applications;
generating service connectivity test results;
perform an outside connectivity test on an Internet failure zone, wherein the outside connectivity test includes testing the connectivity of the Internet outside of the client failure zone and the service failure zone;
generating outside connectivity test results;
automatically analyzing the client connectivity test results, the outside connectivity test results, and the service connectivity results to determine a possible cause of a connectivity issue; and
sending the possible cause to the client device.

12. The computer storage medium of claim 11, wherein performing the client connectivity tests comprises using an account of the client when performing a set of first client connectivity tests.

13. The computer storage medium of claim 11, wherein the Internet failure zone comprise an Internet Service Provider (ISP) and an Internet backbone, and wherein the service failure zone comprises a service computing device and a service network environment.

* * * * *